United States Patent
Pacini et al.

(10) Patent No.: US 9,162,746 B2
(45) Date of Patent: Oct. 20, 2015

(54) LATCH WITH A BUILT-IN ADJUSTMENT MECHANISM

(71) Applicants: Phillip E. Pacini, Redmond, WA (US); Russell J. Branham, Macomb, MI (US)

(72) Inventors: Phillip E. Pacini, Redmond, WA (US); Russell J. Branham, Macomb, MI (US)

(73) Assignee: THE BOEING COMPANY, Chicago, IL (US)

( * ) Notice: Subject to any disclaimer, the term of this patent is extended or adjusted under 35 U.S.C. 154(b) by 214 days.

(21) Appl. No.: 13/630,683

(22) Filed: Sep. 28, 2012

(65) Prior Publication Data
US 2014/0093312 A1    Apr. 3, 2014

(51) Int. Cl.
E05C 21/00 (2006.01)
B64C 1/06 (2006.01)
F16B 5/00 (2006.01)
E05B 63/00 (2006.01)

(52) U.S. Cl.
CPC .............. B64C 1/066 (2013.01); F16B 5/0088 (2013.01); *E05B 2063/0026* (2013.01); *Y10T 403/602* (2015.01)

(58) Field of Classification Search
CPC  E05B 2063/0026; B64C 1/066; F16B 5/0088
USPC ............... 292/1, 18, 44, 45, 60, 63, 219, 220, 292/251, 259 R, 260, 262, 288, 289, 291, 292/293, 294, DIG. 53, DIG. 54, DIG. 60, 292/341.17; 403/321, 325, 326, 353
See application file for complete search history.

(56) References Cited

U.S. PATENT DOCUMENTS

| | | | | |
|---|---|---|---|---|
| 144,094 | A * | 10/1873 | Heiles | ........................ 292/341 |
| 2,286,739 | A | 6/1942 | Krause | |
| 2,538,757 | A | 1/1951 | Bratthauer et al. | |
| 2,540,468 | A | 2/1951 | Anderson et al. | |
| 3,638,285 | A | 2/1972 | Giraldez | |
| 4,045,927 | A | 9/1977 | Diaz | |
| 4,997,218 | A | 3/1991 | Culling | |
| 5,094,485 | A | 3/1992 | Lycett | |
| 5,280,973 | A | 1/1994 | Culling | |
| 6,641,325 | B2 * | 11/2003 | Schwarz | ....................... 403/329 |
| 7,293,813 | B2 | 11/2007 | Squyres et al. | |

(Continued)

FOREIGN PATENT DOCUMENTS

| DE | 89614 C | 5/1896 |
|---|---|---|
| DE | 202009014811 | 2/2010 |

(Continued)

OTHER PUBLICATIONS

PCT Search Report dated Feb. 4, 2014, regarding application No. PCT/US2013/057160, 10 pages.

(Continued)

*Primary Examiner* — Kristina Fulton
*Assistant Examiner* — Christine M Mills
(74) *Attorney, Agent, or Firm* — Yee & Associates, P.C.

(57) ABSTRACT

An apparatus comprising a latch body and a plurality of locking mechanisms. The latch body has a plurality of channels that extend through the latch body. The plurality of locking mechanisms is housed within the latch body. A locking mechanism in the plurality of locking mechanisms comprises a plate and a spring mechanism. The plate has an opening positioned relative to a corresponding channel in the plurality of channels. The spring mechanism is configured to hold the plate in a locked position within the latch body.

20 Claims, 15 Drawing Sheets

(56) References Cited

U.S. PATENT DOCUMENTS

| | | |
|---|---|---|
| 8,435,040 B2 | 5/2013 | Costabel et al. |
| 2009/0261202 A1 * | 10/2009 | Horst et al. .................. 244/131 |
| 2011/0318091 A1 | 12/2011 | Costabel et al. |
| 2014/0325824 A1 | 11/2014 | Pacini et al. |

FOREIGN PATENT DOCUMENTS

| | | | |
|---|---|---|---|
| DE | 202011104559 U1 * | 1/2013 | |
| WO | WO2010100057 A2 | 9/2010 | |

OTHER PUBLICATIONS

International Search Report and Written Opinion dated Aug. 21, 2014, regarding Application No. PCT/US2014/024895, 11 pages.

Office Action, dated May 4, 2015, regarding U.S. Appl. No. 13/866,551, 19 pages.

* cited by examiner

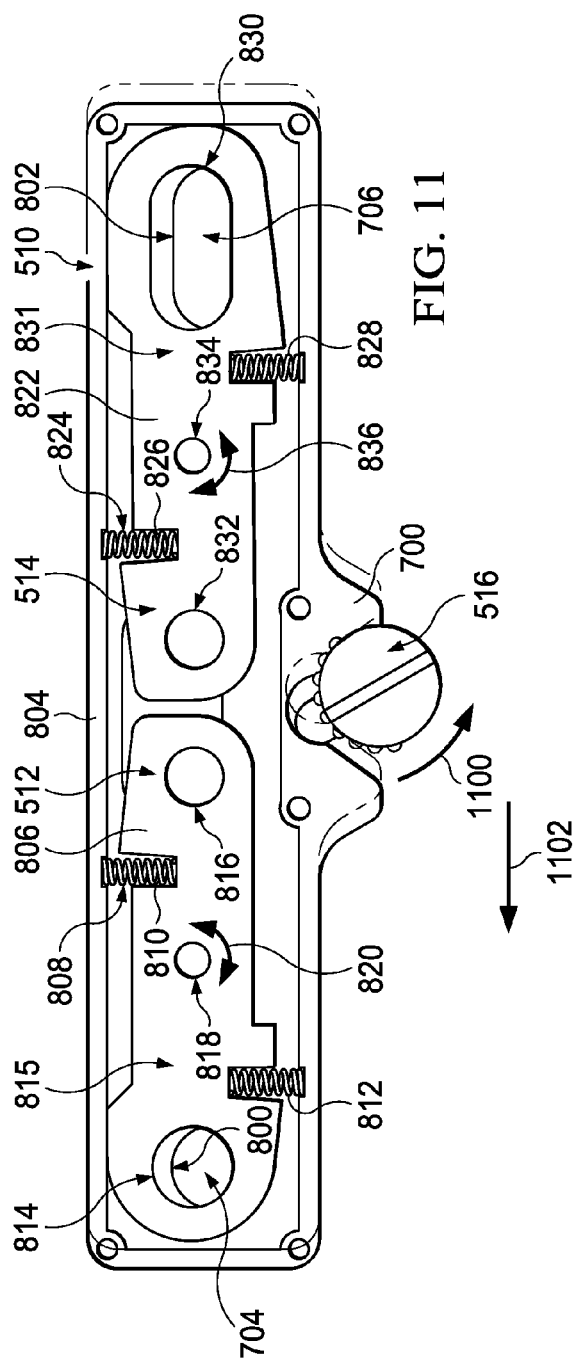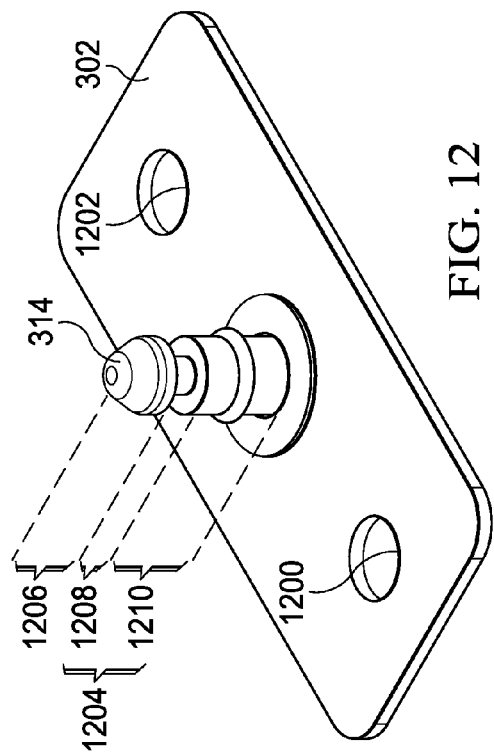

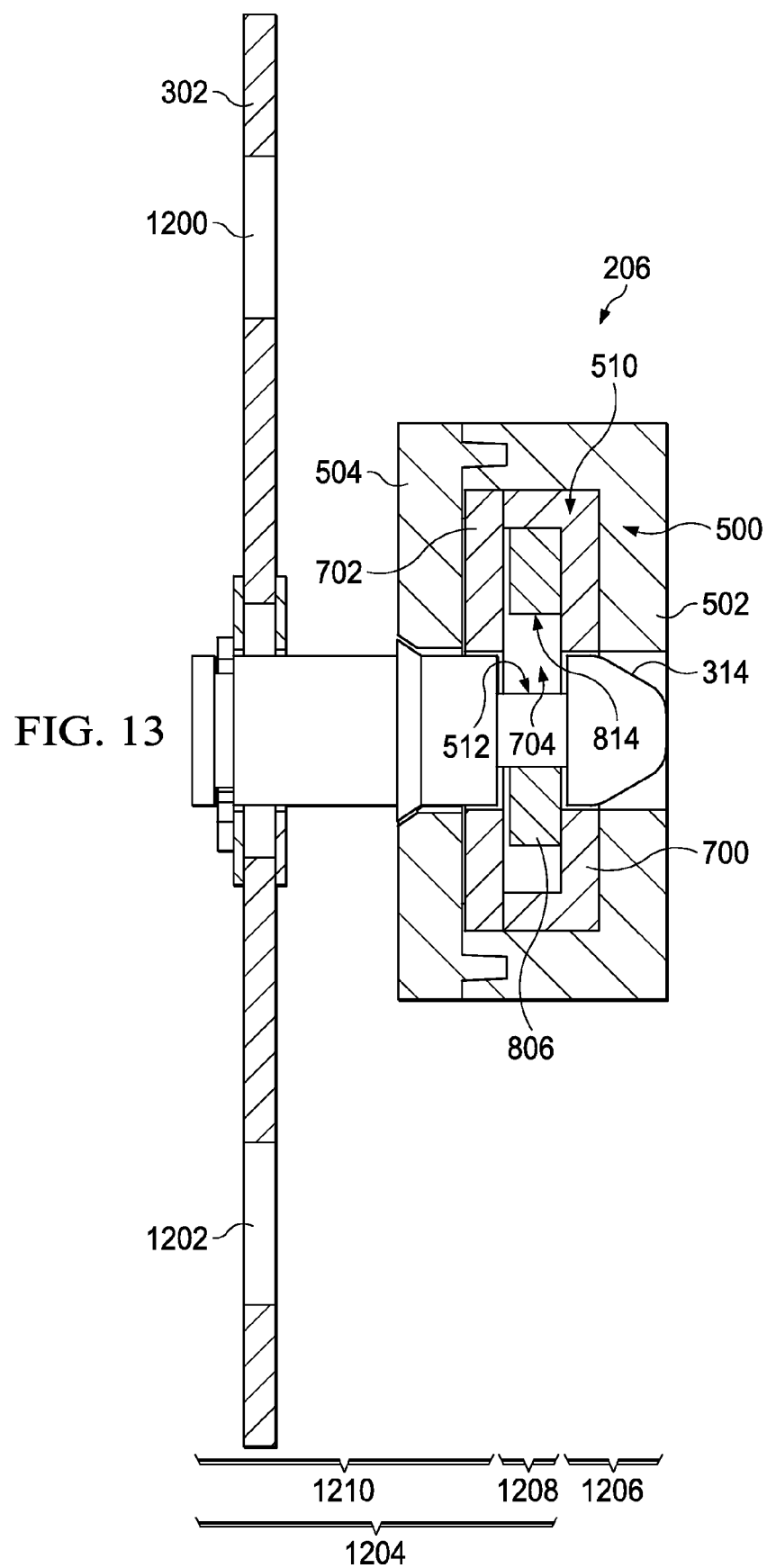

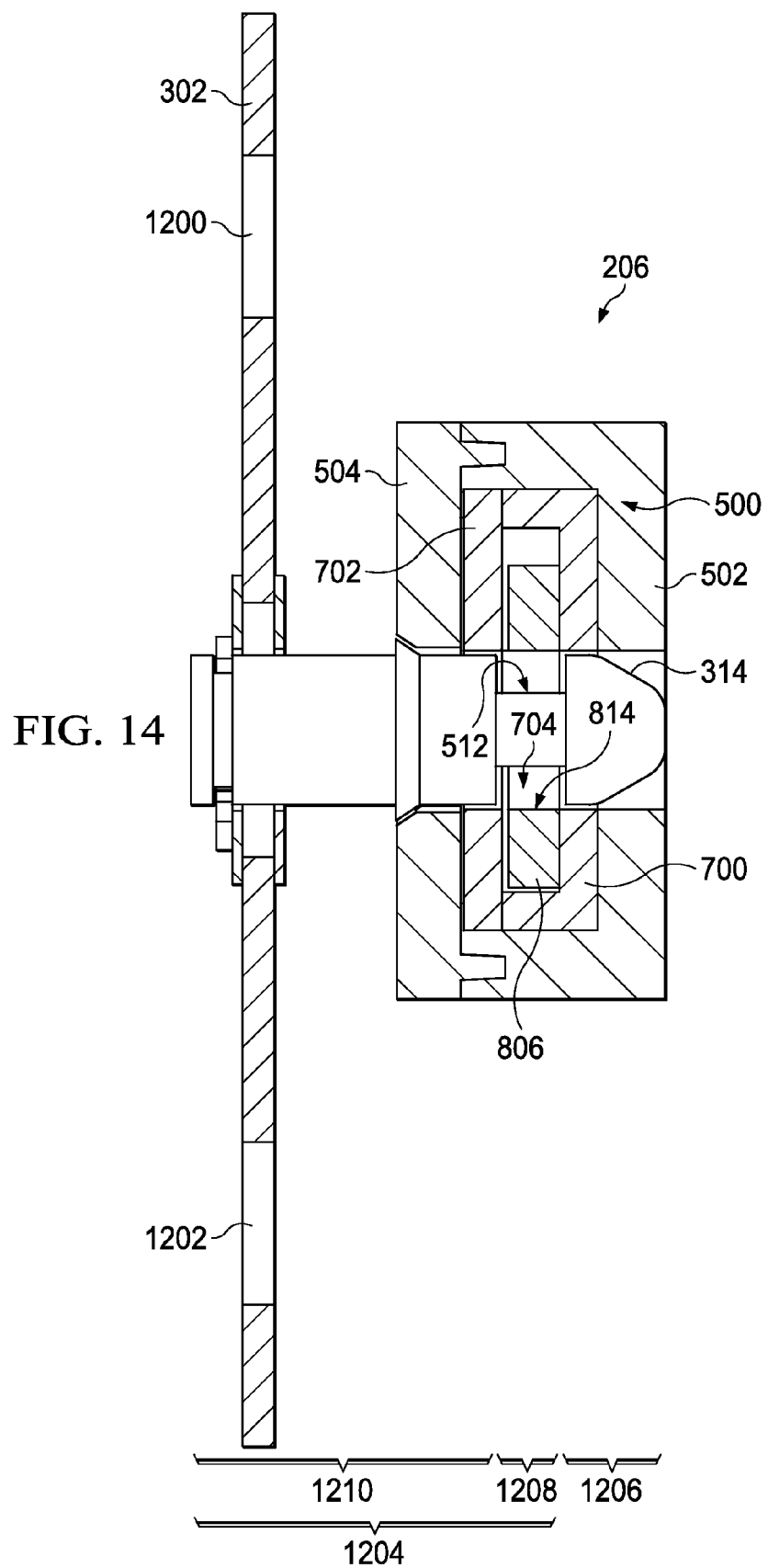

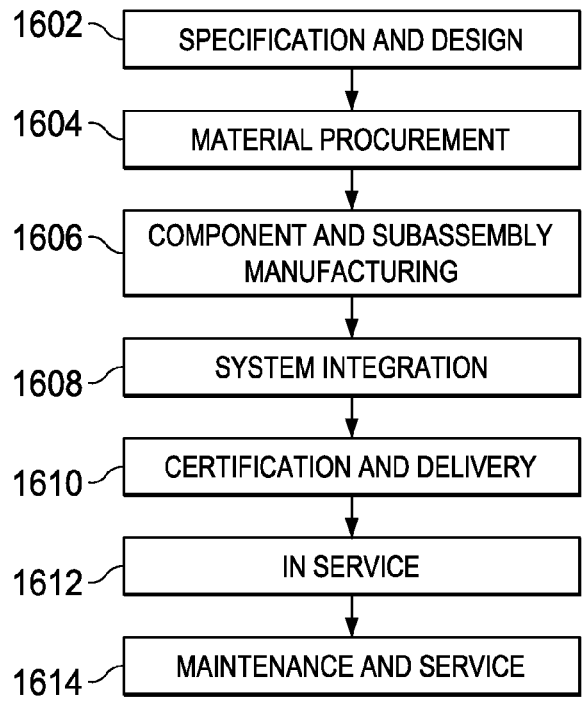
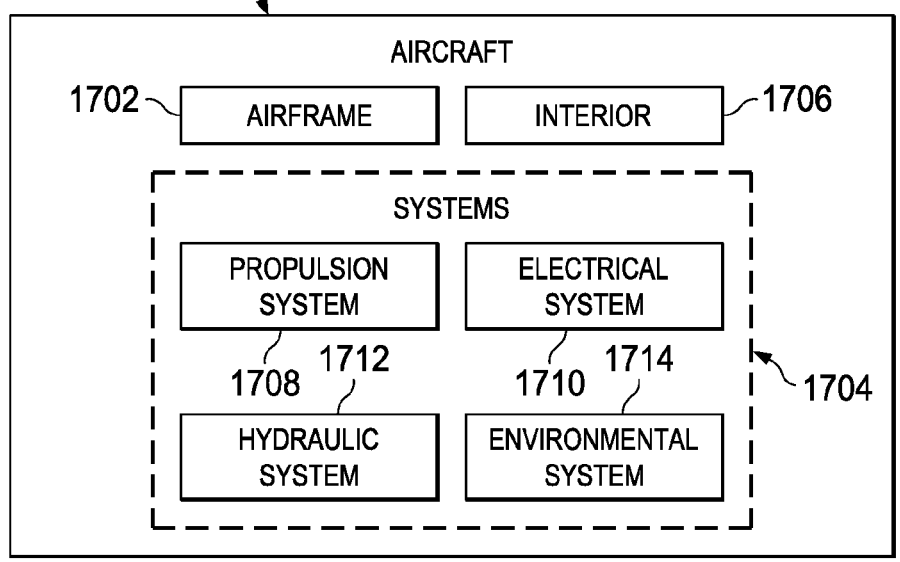

LATCH WITH A BUILT-IN ADJUSTMENT MECHANISM

BACKGROUND INFORMATION

1. Field

The present disclosure relates generally to a latch and, in particular, to a latch for joining panels without using any additional tools. Still more particularly, the present disclosure relates to a latch that allows two panels to be joined and the width of the gap formed between the two panels to be adjusted.

2. Background

Typically, the sidewalls of an aircraft interior are formed by installing panels that are joined together using mechanical fasteners. These panels may be referred to as, for example, "wall panels" or "sidewall panels". With some currently available techniques for joining panels, a bracket having multiple slots is used to join two panels together. Each of these slots has an elongate shape such as, for example, an oval shape. A nut plate is located within each of these slots and is allowed to move freely within the corresponding slot of the bracket. Each of the nut plates is configured to receive the threaded end of a screw.

These screws are used to fasten the panels to the bracket. In particular, each panel may have an attachment feature, such as, for example, without limitation, a loop, configured to receive the threaded end of a screw. When the bracket and the nut plates located in the slots of the bracket are positioned relative to the panels, screws are driven through the loops and into the nut plates to fasten the panels to the bracket. In this manner, the two panels are joined together by the bracket.

However, joining panels using these types of brackets, nut plates, and screws may take more time and/or effort than desired. Additionally, tools may be needed to drive the screws into the nut plates. For example, screwdrivers, screw guns, and/or other types of tools may be needed.

Further, with these types of currently available techniques, the panels may be joined outside of selected tolerances. In particular, the width of the gap formed between the panels after the panels are joined together may be greater than desired. Consequently, the installation of these panels may need to be reworked multiple times to achieve an installation of panels that are within selected tolerances. This reworking may take more time and/or effort than desired. Further, the reworking may be more expensive than desired. Therefore, it would be desirable to have a method and apparatus that takes into account at least some of the issues discussed above, as well as other possible issues.

SUMMARY

In one illustrative embodiment, an apparatus comprises a latch body and a plurality of locking mechanisms. The latch body has a plurality of channels that extend through the latch body. The plurality of locking mechanisms is housed within the latch body. A locking mechanism in the plurality of locking mechanisms comprises a plate and a spring mechanism. The plate has an opening positioned relative to a corresponding channel in the plurality of channels. The spring mechanism is configured to hold the plate in a locked position within the latch body.

In another illustrative embodiment, a latch comprises a housing, a latch body, a plurality of locking mechanisms, and an adjustment mechanism. The latch body is housed within the housing and has a plurality of channels that extend through the latch body. The plurality of locking mechanisms is housed within the latch body. A locking mechanism in the plurality of locking mechanisms comprises a plate and a spring mechanism. The plate has an opening positioned relative to a corresponding channel in the plurality of channels. The spring mechanism comprises a plurality of compression springs configured to hold the plate in a locked position within the latch body. The adjustment mechanism is configured to move the latch body and the plurality of locking mechanisms housed within the latch body in a direction along an axis independently of the housing.

In yet another illustrative embodiment, a method for attaching a latch to a number of panels is provided. A load is applied to a spring mechanism in the latch to move a plate in the latch into an unlocked position. The unlocked position is configured to allow a fastener to pass through an opening in the plate. The spring mechanism and the plate form a locking mechanism that is housed within a latch body. The load applied to the spring mechanism is removed after a selected portion of the fastener has passed through the opening in the plate such that the plate moves into a locked position.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of an adjusted latch body in accordance with an illustrative embodiment;

FIG. 12 is an isometric view of a structural member and a fastener in accordance with an illustrative embodiment;

FIG. 13 is an illustration of a cross-sectional view of a latch attached to a structural member in accordance with an illustrative embodiment;

FIG. 14 is another illustration of a cross-sectional view of a latch attached to a structural member in accordance with an illustrative embodiment;

FIG. 16 is an illustration of an aircraft manufacturing and service method in the form of a block diagram in accordance with an illustrative embodiment; and FIG. 17 is an illustration of an aircraft in the form of a block diagram in accordance with an illustrative embodiment.

DETAILED DESCRIPTION

The illustrative embodiments recognize and take into account different considerations. For example, the illustrative embodiments recognize and take into account that a latch that is capable of joining together wall panels without requiring any additional tools may reduce the time and/or effort needed to join and install these wall panels. Further, the illustrative embodiments recognize and take into account that it may be desirable to have a latch that allows the width of the gap formed between joined wall panels to be adjusted without requiring that the wall panels be disengaged and rejoining one or more times.

Thus, the illustrative embodiments provide a method and apparatus for joining panels using a latch that has a built-in adjustment mechanism. Further, the illustrative embodiments provide a latch that does not require any additional tools to lock fasteners received in the latch in fixed positions.

Figure 1:
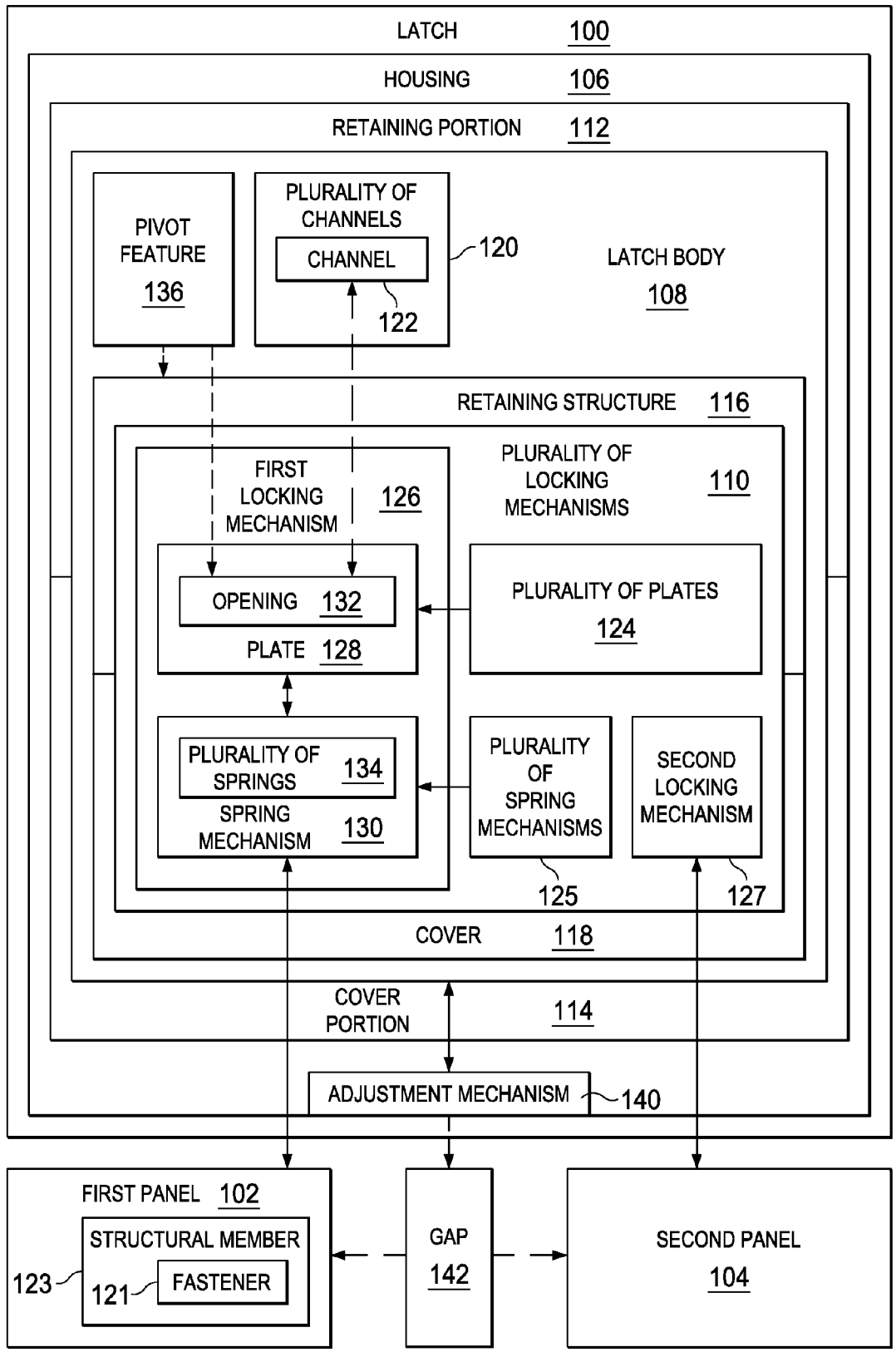
FIG. 1 is an illustration of a latch in the form of a block diagram in accordance with an illustrative embodiment.

With reference now to FIG. 1, an illustration of a latch in the form of a block diagram is depicted in accordance with an illustrative embodiment. In FIG. 1, latch 100 may be used to join first panel 102 and second panel 104. First panel 102 and second panel 104 may be, for example, without limitation, sidewall panels for the interior of an aircraft.

In these illustrative examples, latch 100 includes housing 106, latch body 108, and plurality of locking mechanisms 110. As depicted, housing 106 is configured to house latch body 108 and plurality of locking mechanisms 110. In one illustrative example, housing 106 comprises retaining portion 112 and cover portion 114. In this example, retaining portion 112 is configured to hold latch body 108, while cover portion 114 is configured to cover latch body 108. In particular, retaining portion 112 forms a first side of housing 106, and cover portion 114 forms a second side of housing 106. Depending on the implementation, retaining portion 112 and cover portion 114 may be two portions of a same structure or two different pieces.

Within housing 106, latch body 108 houses plurality of locking mechanisms 110. In one illustrative example, latch body 108 comprises retaining structure 116 and cover 118. Retaining structure 116 is configured to hold plurality of locking mechanisms 110, while cover 118 is configured to cover plurality of locking mechanisms 110. Depending on the implementation, retaining structure 116 and cover 118 may be two portions of a same structure or two different pieces.

Retaining structure 116 forms a first side of latch body 108, and cover 118 forms a second side of latch body 108. Latch body 108 has plurality of channels 120 that extend from the first side of latch body 108 to the second side of latch body 108. In particular, each channel in plurality of channels 120 is formed by the volume of space located inside latch body 108 between an opening in retaining structure 116 and a corresponding opening in cover 118.

In this manner, each channel in plurality of channels 120 is open at both ends. The sizes of these openings are selected such that each channel in plurality of channels 120 is capable of receiving a fastener and allowing the fastener to pass through the channel. The fastener may be, for example, a screw.

Channel 122 is an example of one of plurality of channels 120. Channel 122 may be configured to receive a fastener, such as, for example, fastener 121. Fastener 121 may be associated with first panel 102.

When one component is "associated" with another component, the association is a physical association in the depicted examples. For example, a first component, such as fastener 121 may be considered to be associated with a second component, first panel 102, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In one illustrative example, fastener 121 is associated with first panel 102 through structural member 123. In particular, fastener 121 is attached to structural member 123, which in turn, is attached to first panel 102. Fastener 121 may be, for example, a screw.

As depicted, plurality of locking mechanisms 110 is formed by plurality of plates 124 and plurality of spring mechanisms 125. More specifically, each locking mechanism in plurality of locking mechanisms 110 is formed by a plate in plurality of plates 124 and a corresponding spring mechanism in plurality of spring mechanisms 125.

First locking mechanism 126 and second locking mechanism 127 are examples of locking mechanisms in plurality of locking mechanisms 110. First locking mechanism 126 is configured to be connected to first panel 102, while second locking mechanism 127 is configured to be connected to second panel 104.

As depicted, first locking mechanism 126 is formed by plate 128 from plurality of plates 124 and spring mechanism 130 from plurality of spring mechanisms 125. In this illustrative example, plate 128 has opening 132. When opening 132 of plate 128 is aligned with channel 122 within selected tolerances, fastener 121 may be inserted into channel 122 and moved through channel 122. However, when opening 132 of plate 128 is not aligned with channel 122 within selected tolerances, fastener 121 located within channel 122 may be held in a fixed or locked position. In other words, fastener 121 may be unable to move through channel 122 when opening 132 of plate 128 is not aligned with channel 122 within selected tolerances.

Spring mechanism 130 is configured to hold plate 128 in a position in which opening 132 is unaligned with channel 122 within selected tolerances. In one illustrative example, spring mechanism 130 comprises plurality of springs 134. Plurality of springs 134 may be compression springs in this example. As used herein, a "compression spring" is a spring configured to compress or shorten in length when a load is applied to the spring.

Plurality of springs 134 may be positioned relative to plate 128 and latch body 108 in a manner such that plate 128 is held in a fixed position when no loads are applied to any of plurality of springs 134. This fixed position is referred to as a locked position. When plate 128 is in the locked position, opening 132 of plate 128 is not aligned with channel 122 within selected tolerances.

However, an external load may be applied to plate 128 to cause plate 128 to rotate about pivot feature 136. This rotation causes a load to be applied to at least one of plurality of springs 134, which in turn, causes the at least one of plurality of springs 134 to compress. In this manner, the position of plate 128 within latch body 108 may be changed, thereby changing the alignment of opening 132 with respect to channel 122.

In one illustrative example, the external load may be applied to plate 128 when fastener 121 is inserted into channel 122 of latch body 108. For example, fastener 121 may be inserted into channel 122 such that at least a portion of fastener 121 is received within opening 132 in plate 128.

Force may be applied to fastener 121 along an axis through opening 132 in the direction in which fastener 121 is being inserted into channel 122. In other words, fastener 121 may be pushed through opening 132. The axis through opening 132 may be substantially perpendicular to plate 128. The force applied to fastener 121 applies a load to plate 128, which in turn, applies a load to at least one of plurality of springs 134 that causes the at least one of plurality of springs 134 to compress. In this manner, pushing fastener 121 through opening 132 causes the position of plate 128 to change.

Fastener 121 may be pushed through opening 132 until plate 128 is moved into an unlocked position. When plate 128 is in an unlocked position, opening 132 of plate 128 is substantially aligned with channel 122 within selected tolerances. With plate 128 in an unlocked position, a selected portion of fastener 121 may be moved through opening 132.

Once the selected portion of fastener 121 has passed through opening 132, the force being applied to fastener 121 may be removed. Removing the force applied to fastener 121 in turn, removes the load applied to the at least one of plurality of springs 134. In particular, fastener 121 is no longer being pushed, the load applied to plate 128 is removed, which in turn, removes the load applied to the at least one of plurality of springs 134.

Removing these load causes plate 128 to move back into a locked position. In particular, plate 128 moves such that plate 128 locks fastener 121 in place with respect to the axis through opening 132. Fastener 121 is locked in place by the misalignment between opening 132 and channel 122. Once fastener 121 is locked in place, fastener 121 may not be pulled out through opening 132 without applying a load to at least one of plurality of springs 134.

Pivot feature 136 may be associated with plate 128 and/or retaining structure 116. For example, pivot feature 136 may be part of retaining structure 116 in the form of a protrusion on an inner surface of retaining structure 116. In another example, pivot feature 136 may be a rivet attached to the inner surface of retaining structure 116. In yet another example, pivot feature 136 may be a structural feature considered part of plate 128. In still another example, pivot feature 136 may be a part connected to plate 128 and retaining structure 116.

When fastener 121 is locked in a fixed position within channel 122 by first locking mechanism 126, latch body 108 is considered fastened or attached to first panel 102. Second locking mechanism 127 may be used to fasten or attach latch body 108 to second panel 104 in a similar manner. In this manner, first locking mechanism 126 and second locking mechanism 127 are used to join first panel 102 to second panel 104.

In these illustrative examples, latch 100 includes adjustment mechanism 140 configured to adjust the width of gap 142 formed between first panel 102 and second panel 104. Adjustment mechanism 140 may be considered a "built-in" adjustment mechanism.

Adjustment mechanism 140 is configured to move latch body 108 along an axis relative to housing 106. In some cases, movement of latch body 108 causes fastener 121 and thereby first panel 102 to be moved along with latch body 108. However, in other cases, latch body 108 may move without moving fastener 121 or first panel 102.

In one illustrative example, opening 132 and the openings in retaining structure 116 and cover 118 that form channel 122 may have sizes and/or shapes based on the size and/or shape, respectively, of fastener 121. In some illustrative examples, opening 132 and the openings in retaining structure 116 and cover 118 that form channel 122 may be configured to form an interference fit with fastener 121 when fastener is inserted into channel 122. In this example, movement of latch body 108 causes fastener 121 and thereby first panel 102 to be moved along with latch body 108.

However, in other illustrative examples, opening 132 and channel 122 may be elongated with respect to the axis along which latch body 108 is moved. In other words, opening 132 and the openings in retaining structure 116 and cover 118 that form channel 122 may be slotted.

In these examples, the shape of opening 132 and the openings in retaining structure 116 and cover 118 that form channel 122 allow adjustment mechanism 140 to move latch body 108 without moving fastener 121 located within channel 122 and opening 132. The shape of opening 132 may be, for example, a circular shape, an elongated circular shape, an oval shape, a square shape, a rectangular shape, and/or other shapes. The distance by which latch body 108 may be moved along the axis is limited by the length of retaining portion 112 of housing 106 and/or the length of opening 132 and the lengths of the openings in retaining structure 116 and cover 118 that form channel 122.

In some cases, adjustment mechanism 140 may be used to move latch body 108 and second panel 104 fastened to latch body 108 without moving fastener 121 or first panel 102. In this manner, the width of gap 142 between first panel 102 and second panel 104 may be adjusted using adjustment mechanism 140.

The illustration of latch 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, only one end of channel 122 in plurality of channels 120 may be open. For example, in some cases, channel 122 may extend from an opening in cover 118 to the inside surface of retaining structure 116 within latch body 108. As another example, channel 122 may extend from an opening in retaining structure 116 to the inside surface of cover 118 within latch body 108.

In other illustrative examples, more than two locking mechanisms may be present in plurality of locking mechanisms 110. For example, two locking mechanisms in plurality of locking mechanisms 110 may be used to attach latch body 108 to first panel 102.

Figure 2:
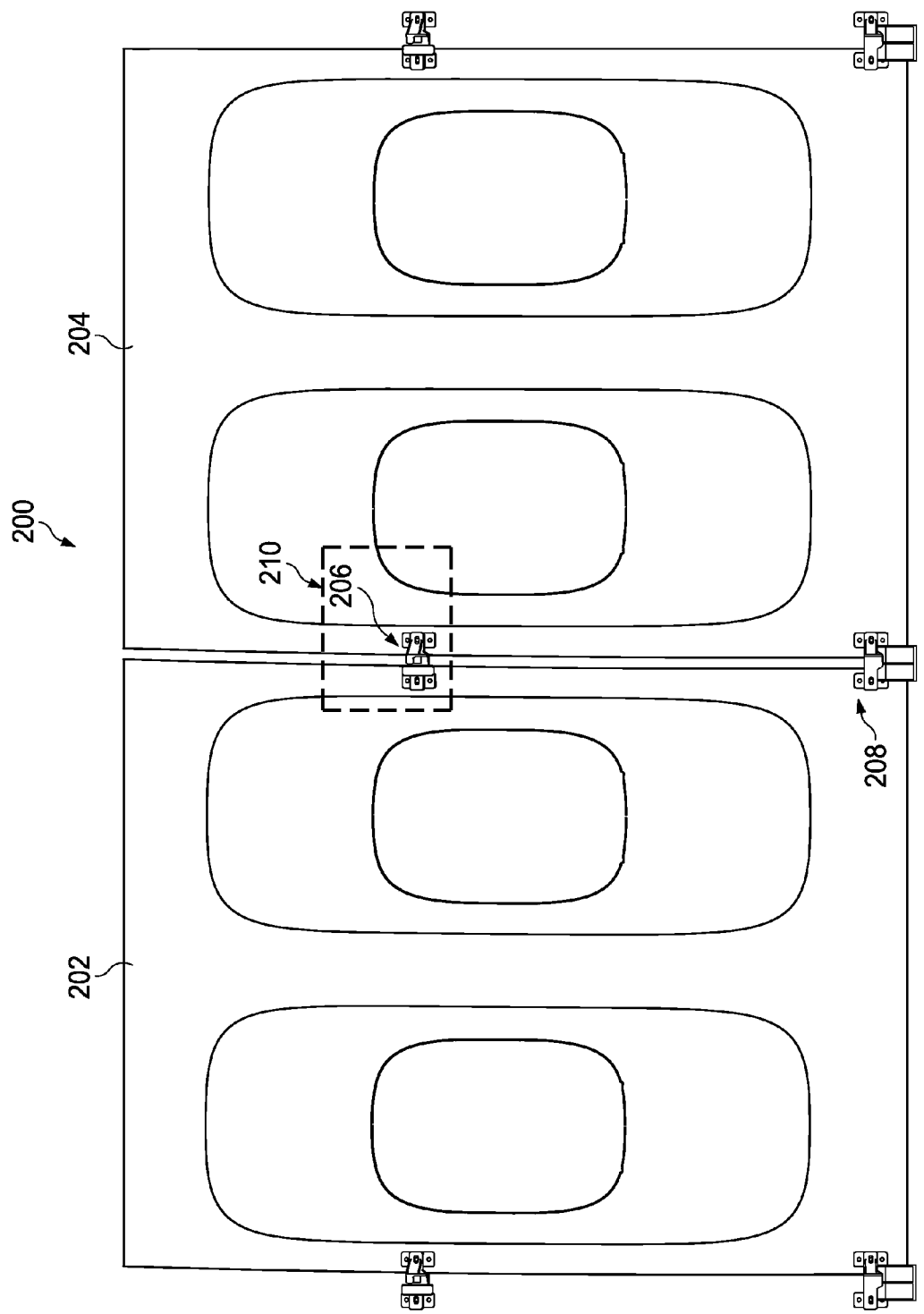
FIG. 2 is an illustration of a portion of a sidewall for an interior of an aircraft in accordance with an illustrative embodiment.

Turning now to FIG. 2, an illustration of a portion of a sidewall for an interior of an aircraft is depicted in accordance with an illustrative embodiment. As depicted in FIG. 2, a portion of sidewall 200 for an interior of an aircraft is depicted. This portion of sidewall 200 is formed by first panel 202 and second panel 204. First panel 202 and second panel 204 are examples of implementations for first panel 102 and second panel 104, respectively, in FIG. 1.

As depicted, first panel 202 and second panel 204 are joined using latch 206 and latch 208. Latch 206 and latch 208 are implemented in a manner similar to the manner in which latch 100 in FIG. 1 is implemented. Latch 206 is described in greater detail in FIGS. 2-14 below. In particular, portion 210 of sidewall 200 is shown in an enlarged view in FIG. 3.

Figure 3:
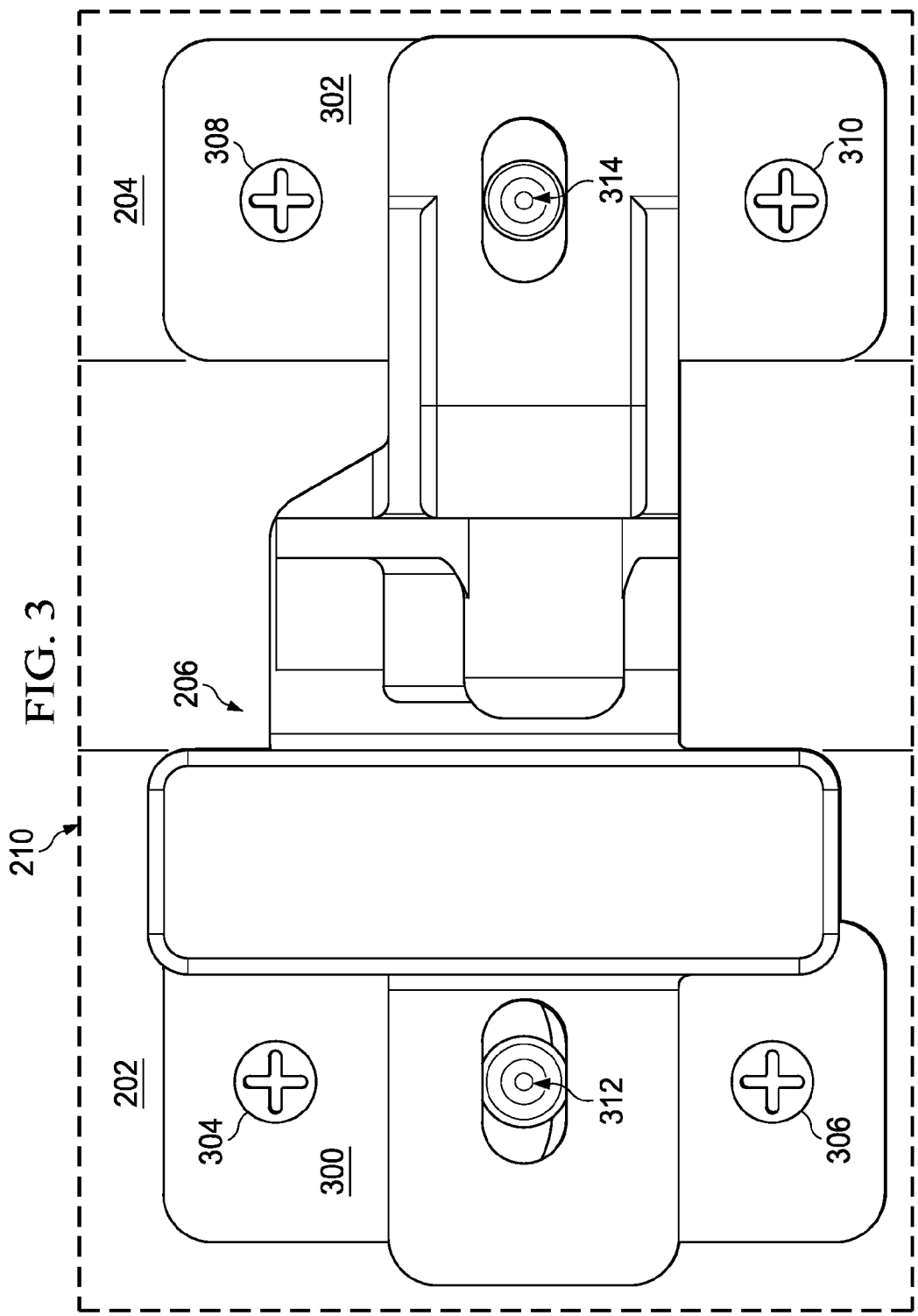
FIG. 3 is an illustration of an enlarged view of a portion of a sidewall for an interior of an aircraft with a latch in accordance with an illustrative embodiment.

With reference now to FIG. 3, an illustration of an enlarged view of portion 210 of sidewall 200 with latch 206 from FIG. 2 is depicted in accordance with an illustrative embodiment. In this illustrative example, latch 206 is attached to first panel 202 using structural member 300 and to second panel 204 using structural member 302. Structural member 300 and structural member 302 take the form of plates in this illustrative example.

Fastener 304 and fastener 306 have been used to attach structural member 300 to first panel 202. Fastener 308 and fastener 310 have been used to attach structural member 302 to second panel 204. Further, latch 206 has been attached to structural member 300 using fastener 312. Latch 206 has been attached to structural member 302 using fastener 314.

Figure 4:
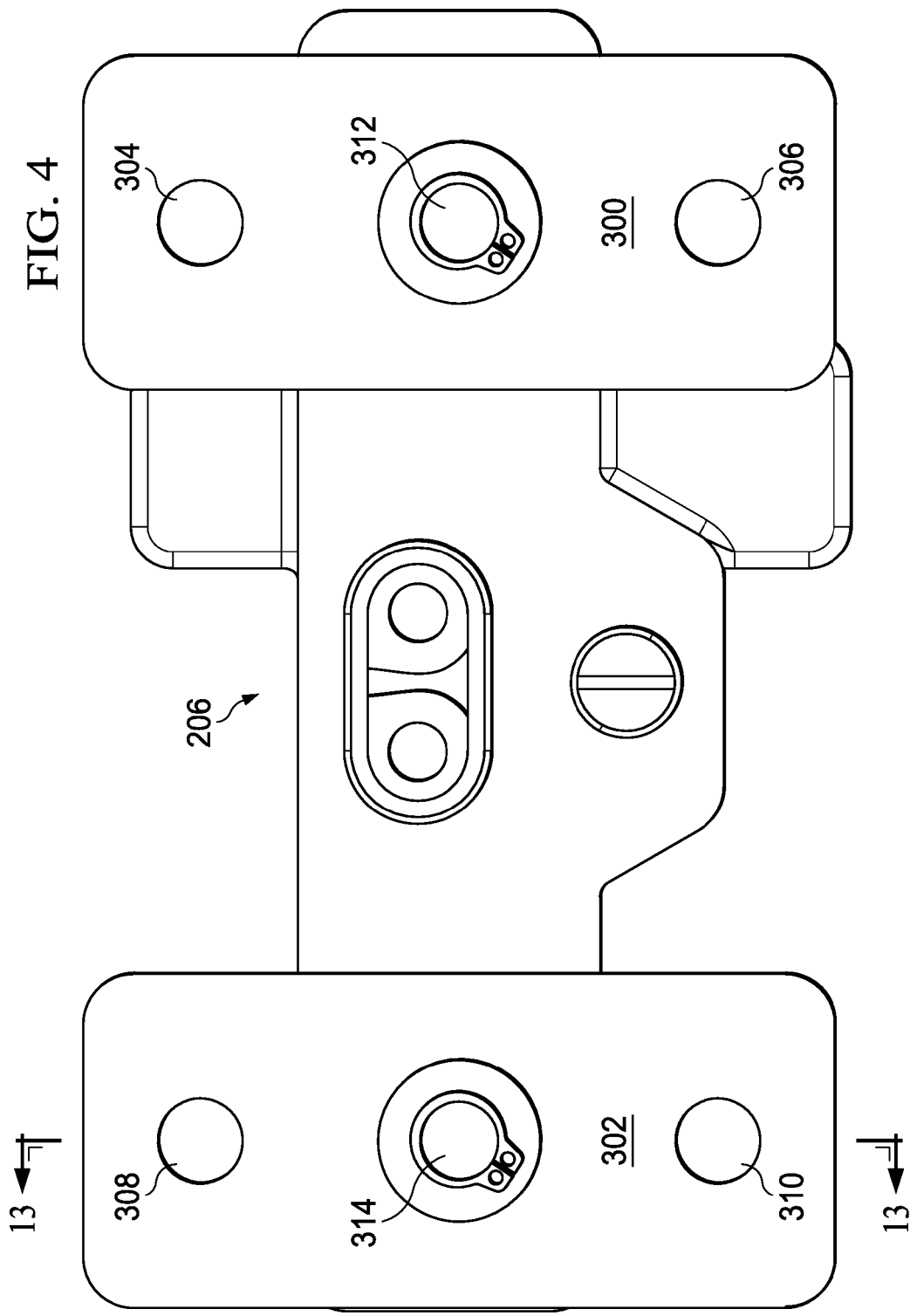
FIG. 4 is an illustration of another view of a latch attached to two structural members in accordance with an illustrative embodiment.

Turning now to FIG. 4, an illustration of another view of latch 206 attached to structural member 300 and structural member 302 from FIG. 3 is depicted in accordance with an illustrative embodiment. In FIG. 4, an opposite view of latch 206 attached to structural member 300 and structural member 302 from FIG. 3 is depicted. First panel 202 and second panel 204 are not shown in this view.

Figure 5:
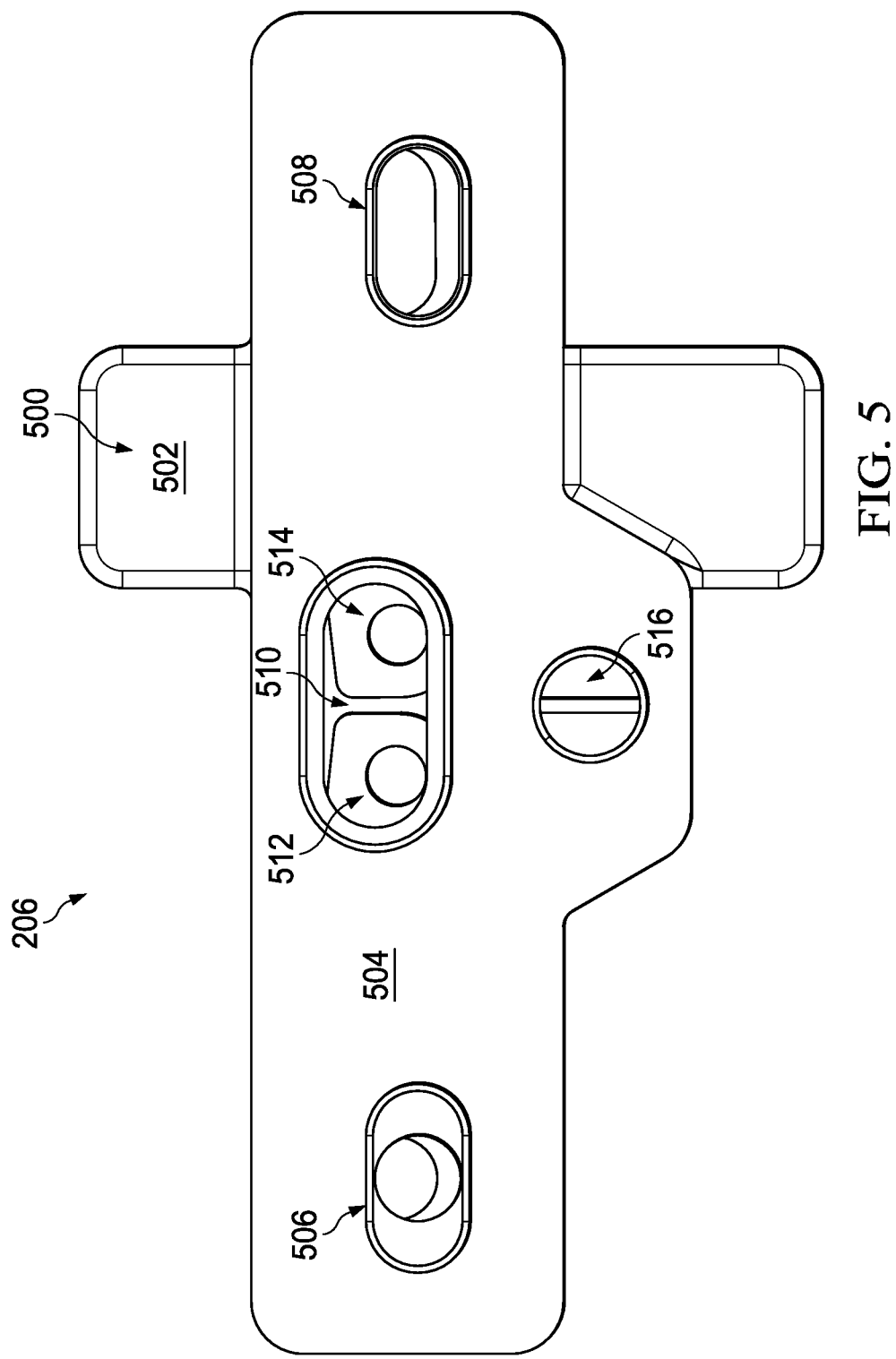
FIG. 5 is another illustration of a latch in accordance with an illustrative embodiment.

With reference now to FIG. 5, an illustration of latch 206 from FIG. 4 is depicted in accordance with an illustrative embodiment. In this illustrative example, latch 206 is depicted without structural member 300 and structural member 302 in FIG. 4 attached to latch 206.

As depicted, latch 206 includes housing 500. Housing 500 is an example of one implementation for housing 106 for latch 100 in FIG. 1. In this illustrative example, housing 500 includes retaining portion 502 and cover portion 504. Cover portion 504 has opening 506 and opening 508. In this illustrative example, opening 506 has a circular shape, while opening 508 has an elongated circular shape. Opening 508 may be referred to as a slotted opening.

Opening 506 is configured to receive fastener 314 from FIG. 3, while opening 508 is configured to receive fastener 312 from FIG. 3. Retaining portion 502 also has two openings (not shown in this view).

Housing 500 houses latch body 510, first locking mechanism 512, and second locking mechanism 514. In particular, retaining portion 502 of housing 500 holds latch body 510, first locking mechanism 512, and second locking mechanism 514. Cover portion 504 of housing 500 covers latch body 510, first locking mechanism 512, and second locking mechanism 514.

Latch body 510 is an example of one implementation for latch body 108 in FIG. 1. First locking mechanism 512 and second locking mechanism 514 are examples of implementations for first locking mechanism 126 and second locking mechanism 127 in FIG. 1. Latch body 510, first locking mechanism 512, and second locking mechanism 514 are described in greater detail in FIGS. 7-11 below.

Additionally, latch 206 includes adjustment mechanism 516. Adjustment mechanism 516 is associated with latch body 510 and is configured to move latch body 510 within housing 500. Adjustment mechanism 516 is described in greater detail in FIGS. 7-11 below.

Figure 6:
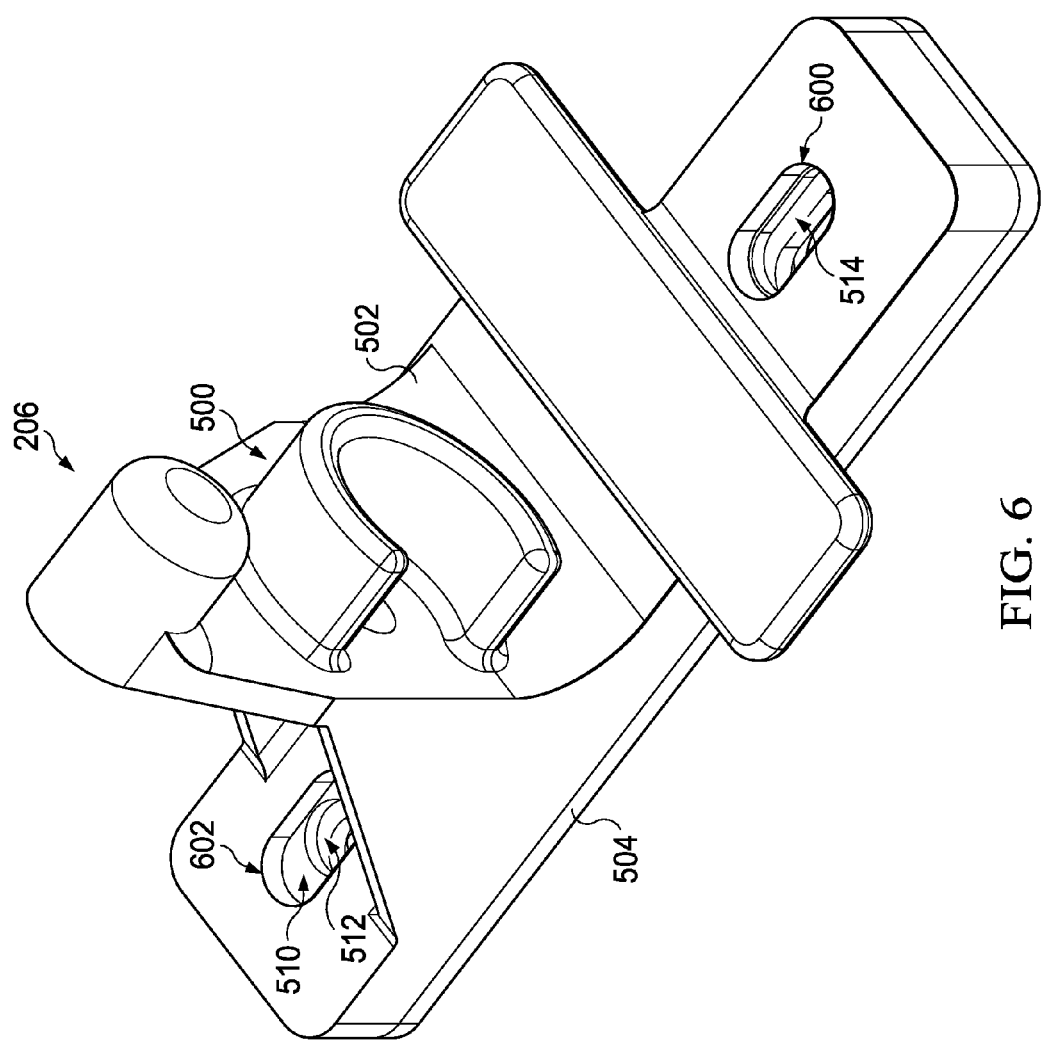
FIG. 6 is an illustration of another view of a latch in accordance with an illustrative embodiment.

With reference now to FIG. 6, an illustration of another view of latch 206 is depicted in accordance with an illustrative embodiment. In this illustrative example, retaining portion 502 of housing 500 is seen more clearly. As depicted, retaining portion 502 has opening 600 and opening 602.

Opening 600 has an elongated circular shape, while opening 602 has a circular shape. Opening 600 may be referred to as a slotted opening. Opening 600 is configured to receive fastener 312 from FIG. 3, while opening 602 is configured to receive fastener 314 from FIG. 3.

Figure 7:
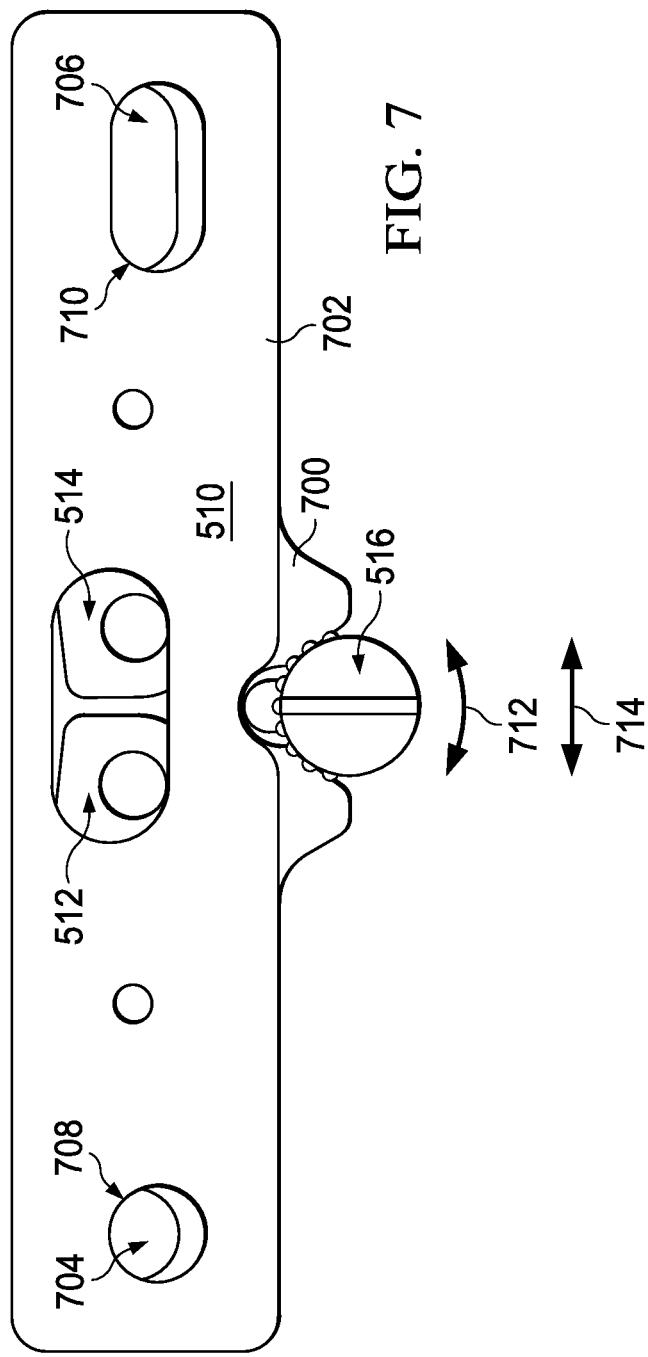
FIG. 7 is an illustration of a latch body in accordance with an illustrative embodiment.

Turning now to FIG. 7, an illustration of latch body 510 from FIG. 5 is depicted in accordance with an illustrative embodiment. In this illustrative example, housing 500 from FIG. 5 is not shown in this view such that latch body 510 housed within housing 500 may be seen. Latch body 510 houses first locking mechanism 512 and second locking mechanism 514.

As depicted, latch body 510 comprises retaining structure 700 and cover 702. Retaining structure 700 of latch body 510 holds first locking mechanism 512 and second locking mechanism 514. Cover 702 covers first locking mechanism 512 and second locking mechanism 514.

Additionally, latch body 510 has channel 704 and channel 706. Channel 704 extends through latch body 510 between opening 708 in cover 702 and an opening (not shown in this view) in retaining structure 700. These openings have circular shapes in this illustrative example. Consequently, channel 704 has a circular cylindrical shape. In other illustrative examples, channel 704 may have a circular cylindrical shape, an elongated cylindrical shape, an elliptic cylindrical shape, a hyperbolic cylindrical shape, a parabolic cylindrical shape, a prism shape, and/or other shapes. Channel 704 is configured to receive fastener 314 from FIG. 3.

Further, channel 706 extends through latch body 510 between opening 710 in cover 702 and an opening (not shown in this view) in retaining structure 700. These openings have elongated circular shapes in this illustrative example. Consequently, channel 706 has an elongated cylindrical shape. Channel 706 is configured to receive fastener 312 from FIG. 3.

In this illustrative example, adjustment mechanism 516 may be rotated in the direction of arrow 712 to move latch body 510 in a direction along axis 714. Adjustment mechanism 516 is configured to move latch body 510 independently of housing 500 in FIG. 5. Further, when adjustment mechanism 516 moves latch body 510, first locking mechanism 512 and second locking mechanism 514 held within latch body 510 are also moved.

Figure 8:
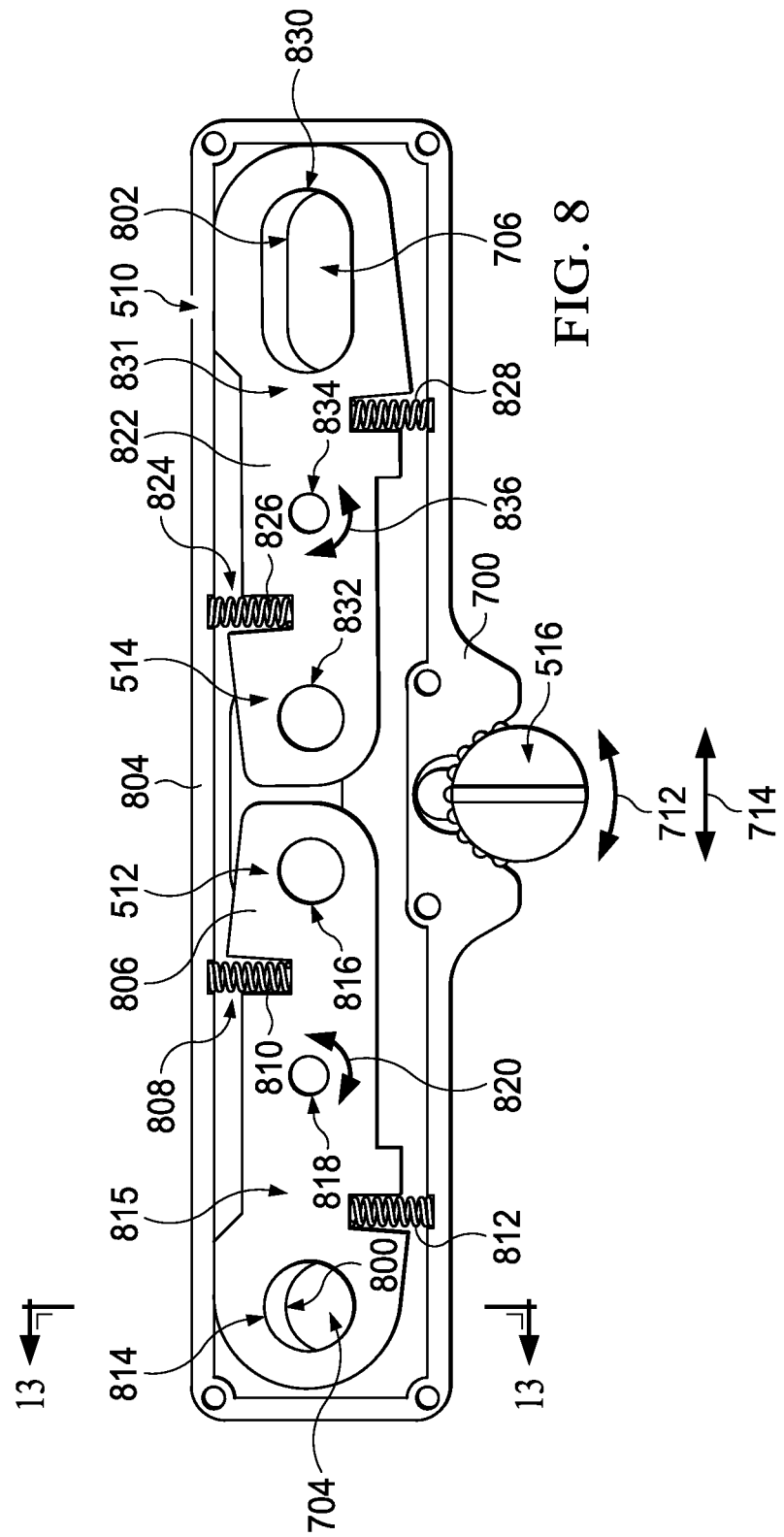
FIG. 8 is an illustration of a first locking mechanism and a second locking mechanism held within a retaining structure in accordance with an illustrative embodiment.

With reference now to FIG. 8, an illustration of first locking mechanism 512 and second locking mechanism 514 held within retaining structure 700 from FIG. 7 is depicted in accordance with an illustrative embodiment. In this illustrative example, cover 702 of latch body 510 from FIG. 7 has been removed such that first locking mechanism 512 and second locking mechanism 514 may be seen. As depicted, first locking mechanism 512 and second locking mechanism 514 are positioned within edge 804 of retaining structure 700.

With cover 702 from FIG. 7 removed, opening 800 and opening 802 in retaining structure 700 are seen. Opening 800 has a circular shape, while opening 802 has an elongated circular shape. Channel 704 extends out through opening 800 in retaining structure 700, while channel 706 extends out through opening 802 in retaining structure 700.

As depicted, first locking mechanism 512 includes plate 806 and spring mechanism 808. Spring mechanism 808 comprises compression spring 810 and compression spring 812. Further, plate 806 has opening 814 and opening 816. Opening 814 and opening 816 both have circular shapes in this illustrative example.

Compression spring 810 and compression spring 812 are positioned between plate 806 and edge 804 of retaining structure 700 in a manner that keeps plate 806 in locked position 815 relative to retaining structure 700. When plate 806 is in locked position 815, first locking mechanism 512 is considered locked.

In locked position 815, opening 814 in plate 806 is not aligned with channel 704 through latch body 510 within selected tolerances. Consequently, channel 704 is partially occluded. In other words, when opening 814 is not aligned with channel 704 within selected tolerances, the size of channel 704 is reduced such that all portions of fastener 314 from FIG. 3 may be unable to pass through the entirety of channel 704.

Opening 816 in plate 806 may be used to move plate 806 such that opening 814 can be aligned with channel 704. In particular, opening 816 in plate 806 may be used to rotate plate 806 about pivot feature 818. In this illustrative example, pivot feature 818 is a rivet attached to retaining structure 700. However, in other illustrative examples, pivot feature 818 may be a structural feature that is part of retaining structure 700 about which plate 806 may rotate. Plate 806 may be rotated about pivot feature 818 in the direction of arrow 820 to align opening 814 with channel 704 within selected tolerances.

In a similar manner, second locking mechanism 514 includes plate 822 and spring mechanism 824. Spring mechanism 824 comprises compression spring 826 and compression spring 828. Further, plate 822 has opening 830 and opening 832. Opening 830 has an elongated circular shape, while opening 832 has a circular shape in this illustrative example. Opening 830 may be referred to as a slotted opening.

Compression spring 826 and compression spring 828 are positioned between plate 822 and edge 804 of retaining structure 700 in a manner that keeps plate 822 in locked position 831 relative to retaining structure 700. When plate 822 is in locked position 831, second locking mechanism 514 is considered locked.

In locked position 831, opening 830 in plate 822 is not aligned with channel 706 through latch body 510 within selected tolerances. Consequently, channel 706 is partially occluded. In other words, when opening 830 is not aligned with channel 706 within selected tolerances, the size of channel 706 is reduced such that all portions of fastener 312 from FIG. 3 may be unable to pass through the entirety of channel 706.

However, opening 832 in plate 822 may be used to move plate 822 such that opening 830 can be aligned with channel 706. In particular, opening 832 in plate 822 may be used to rotate plate 822 about pivot feature 834. In this illustrative example, pivot feature 834 is a rivet attached to retaining structure 700. However, in other illustrative examples, pivot feature 834 may be a structural feature that is part of retaining structure 700 about which plate 822 may rotate. Plate 822 may be rotated about pivot feature 834 in the direction of arrow 836 to align opening 830 with channel 706 within selected tolerances.

Figure 9:
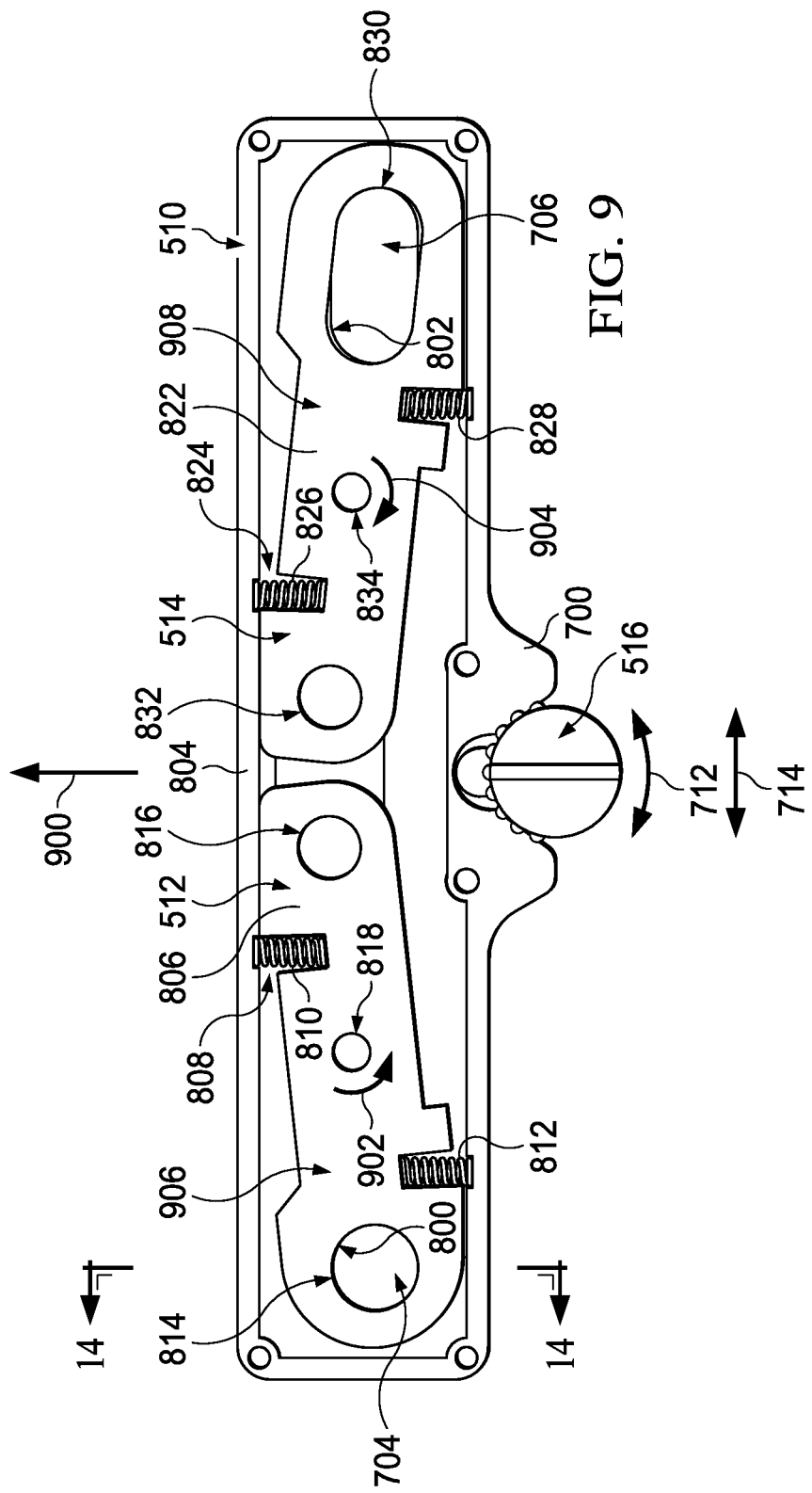
FIG. 9 is an illustration of two plates in unlocked positions in accordance with an illustrative embodiment.

With reference now to FIG. 9, an illustration of plate 806 and plate 822 from FIG. 8 in unlocked positions is depicted in accordance with an illustrative embodiment. In FIG. 9, plate 806 and plate 822 have been moved by applying force to plate 806 and plate 822 in the direction of arrow 900 through opening 816 in plate 806 and opening 832 in plate 822.

When force is applied to plate 806 in the direction of arrow 900, plate 806 rotates about pivot feature 818 in the direction of arrow 902. Further, this force applies a load to compression spring 810 and compression spring 812 such that both of these compression springs contract or shorten in length. Plate 806 has been rotated about pivot feature 818 into unlocked position 906 such that opening 814 in plate 806 is aligned with channel 704 through latch body 510 within selected tolerances. In other words, the rotation of plate 806 into unlocked position 906 unlocks first locking mechanism 512.

Similarly, when force is applied to plate 822 in the direction of arrow 900, plate 822 rotates about pivot feature 834 in the direction of arrow 904. Further, this force applies a load to compression spring 826 and compression spring 828 such that both of these compression springs contract or shorten in length. Plate 822 has been rotated about pivot feature 834 into unlocked position 908 such that opening 830 in plate 822 is aligned with channel 706 through latch body 510 within selected tolerances. In other words, the rotation of plate 822 into unlocked position 908 unlocks second locking mechanism 514.

When the force applied to opening 816 in plate 806 and the force applied to opening 832 in plate 822 to load compression spring 810, compression spring 812, compression spring 826, and compression spring 828, respectively, are removed, these compression springs lengthen such that plate 806 and plate 822, respectively, are moved back into locked position 815 and locked position 831, respectively, from FIG. 8. In other words, when compression spring 810 and compression spring 826 are not loaded, first locking mechanism 512 and second locking mechanism 514 remain locked.

Figure 10:
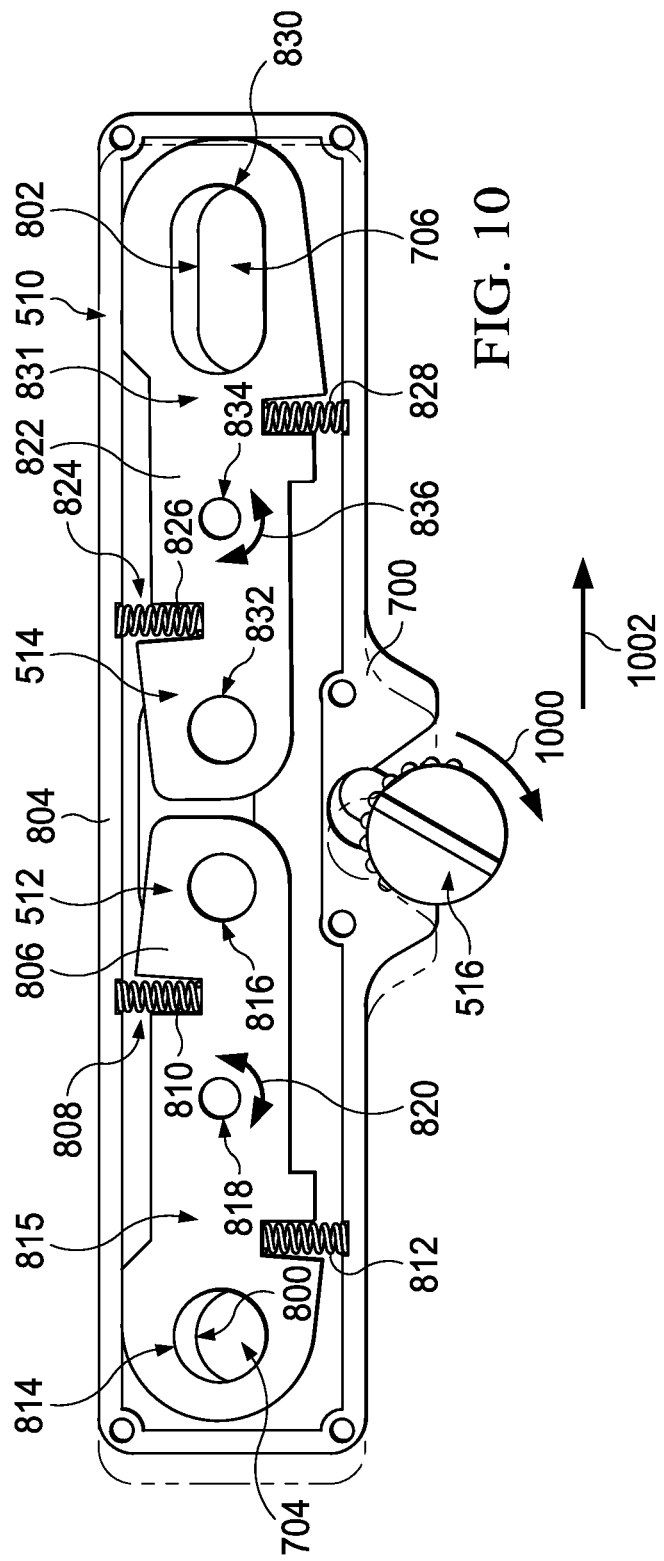
FIG. 10 is an illustration of an adjusted latch body in accordance with an illustrative embodiment.

With reference now to FIG. 10, an illustration of an adjusted latch body is depicted in accordance with an illustrative embodiment. In FIG. 10, adjustment mechanism 516 has been rotated in the direction of arrow 1000. As depicted, this rotation causes latch body 510 along with first locking mechanism 512 and second locking mechanism 514 held within latch body 510 to move in the direction of arrow 1002.

The elongated circular shape of channel 706 and opening 830 in plate 822 allow a fastener, such as fastener 312 from FIG. 3, to move independently of latch body 510 in a direction along axis 714 in FIG. 7 within the length of the opening 830. In other words, movement of latch body 510 in the direction of arrow 1002 may or may not cause a fastener located within channel 706 to move, depending on the staring location of the fastener within channel 706.

With reference now to FIG. 11, an illustration of an adjusted latch body is depicted in accordance with an illustrative embodiment. In FIG. 11, adjustment mechanism 516 has been rotated in the direction of arrow 1100 along axis 714 in FIG. 7. As depicted, this rotation causes latch body 510 along with first locking mechanism 512 and second locking mechanism 514 held within latch body 510 to move in the direction of arrow 1102 along axis 714.

Turning now to FIG. 12, an isometric view of structural member 302 and fastener 314 from FIG. 3 is depicted in accordance with an illustrative embodiment. As illustrated, fastener 314 is attached to structural member 302. Structural member 302 has opening 1200 and opening 1202. Opening 1200 and opening 1202 may be configured to receive fastener 308 and fastener 310, respectively, from FIG. 3 when structural member 302 is attached to second panel 204 in FIGS. 2-3.

Fastener 314 attached to structural member 302 has body 1204 and head 1206. Portion 1208 of body 1204 is smaller in diameter than portion 1210 of body 1204. This difference in diameter along body 1204 of fastener 314 may be used to lock fastener 314 in a fixed position within first locking mechanism 512 in FIGS. 5-11 described above.

With reference now to FIG. 13, an illustration of a cross-sectional view of latch 206 attached to structural member 302 is depicted in accordance with an illustrative embodiment. In FIG. 13, a cross-sectional view of latch 206 attached to structural member 302 is depicted taken along lines 13-13 in FIG. 4.

In this illustrative example, first locking mechanism 512 is locked, which in turn, locks fastener 314 in a fixed position with channel 704 through latch body 510. In particular, when first locking mechanism 512 is locked, opening 814 in plate 806 is positioned relative to portion 1208 of body 1204 of fastener 314 in a manner that substantially prevents fastener 314 from moving through channel 704.

With reference now to FIG. 14, an illustration of a cross-sectional view of latch 206 attached to structural member 302 is depicted in accordance with an illustrative embodiment. In FIG. 14, first locking mechanism 512 from FIG. 13 has been unlocked such that fastener 314 may freely move through channel 704.

The illustrations of latch 206 in FIGS. 2-11 and FIGS. 12-14 and structural member 302 in FIG. 12 are not meant to imply physical or architectural limitations to the manner in which an illustrative embodiment may be implemented. Other components in addition to or in place of the ones illustrated may be used. Some components may be optional.

Additionally, some of the components in FIGS. 2-14 may be illustrative examples of how components shown in block form in FIG. 1 can be implemented as physical structures. The different components shown in FIGS. 2-14 may be combined with components in FIG. 1, used with components in FIG. 1, or a combination of the two.

Figure 15:
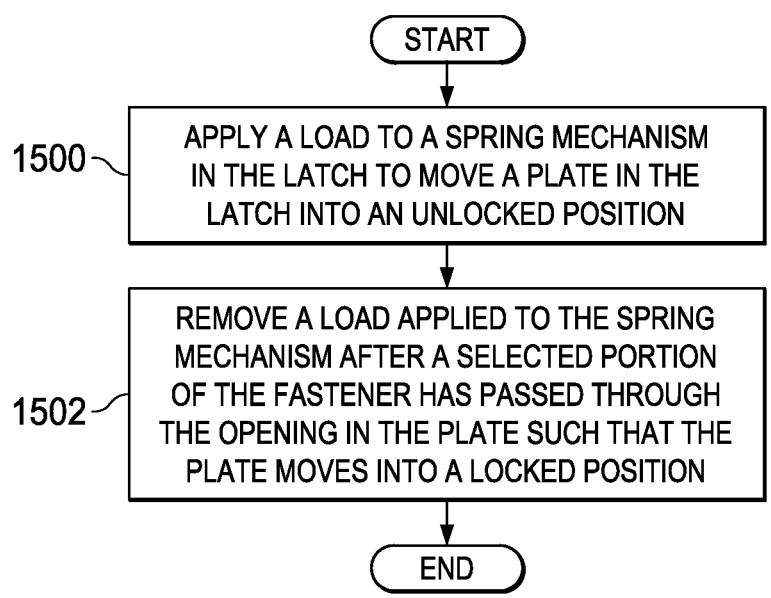
FIG. 15 is an illustration of a process for attaching a latch to a panel in the form of a flowchart in accordance with an illustrative embodiment.

With reference now to FIG. 15, an illustration of a process for attaching a latch to a panel in the form of a flowchart is depicted in accordance with an illustrative embodiment. The process illustrated in FIG. 15 may be implemented using latch 100 in FIG. 1 and/or latch 206 in FIGS. 2-11 and FIGS. 12-14.

The process begins by applying a load to a spring mechanism in the latch to move a plate in the latch into an unlocked position such that a fastener is allowed to pass through an opening in the plate (operation 1500). The spring mechanism and the plate form a locking mechanism that is housed within a latch body of the latch. The plate has an opening positioned relative to a corresponding channel that extends through the latch body.

Operation 1500 may be performed by, for example, without limitation, inserting the fastener through a channel in the latch body corresponding to the opening in the plate. The fastener may be associated with a panel. Applying a force to the fastener at the opening of the plate causes the load to be applied to the spring mechanism in the latch and the plate in the latch to move into the unlocked position.

Next, the load applied to the spring mechanism is removed after a selected portion of the fastener has passed through the opening in the plate such that the plate moves into a locked position (operation 1502), with the process terminating thereafter. In operation 1502, with no external loads are applied to the spring mechanism, the fastener is locked in place when the plate is in the locked position.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in some illustrative examples, the panel described in FIG. 15 may be a first panel and the locking mechanism used to attach the latch to the first panel may be a first locking mechanism. The latch may also be attached to a second panel using a second locking mechanism housed in the latch body. In this manner, the first and second panels may be joined by the latch.

An adjustment mechanism in the latch may be used to adjust the width of the gap formed between the two panels. The adjustment mechanism may be used to move the latch body in a directional along an axis. The opening in the plate in the first locking mechanism and the corresponding channel may be elongate with respect to the axis along which the latch body is capable of moving.

Consequently, the fastener located within this corresponding channel may be able to move within the channel in a direction along the axis. This movement may be independent of the movement of the latch body. Depending on the location of the fastener within the corresponding channel, movement of the latch body by the adjustment mechanism may or may not move the fastener or the panel with which the fastener is associated when the latch body moves.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method in the form of a block diagram is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft in the form of a block diagram is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. For example, latches implemented in a manner similar to latch 100 from FIG. 1 and/or latch 206 from FIGS. 2-11 and FIGS. 13-14 may be used to install the sidewall for interior of aircraft 1700. These latches may be used during component and subassembly manufacturing 1606, system integration 1608, and/or maintenance and service 1614. Further, the different components that make up these latches may be manufactured and/or assembled during at least one of material procurement 1604 and component and subassembly manufacturing 1606.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612 and/or during maintenance and service 1614 in FIG. 16. The use of a number of the different illustrative embodiments may substantially expedite the assembly of and/or reduce the cost of aircraft 1700.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a first fastener attached to a first structural member and a second fastener attached to a second structural member;
    a latch body having a plurality of channels that extend through the latch body;
    a plurality of locking mechanisms housed within the latch body, wherein a first locking mechanism in the plurality of locking mechanisms receives the first fastener and a second locking mechanism in the plurality of locking mechanisms receives the second fastener, wherein the first locking mechanism comprises:
        a plate having an elongated opening positioned relative to a corresponding channel in the plurality of channels, wherein the elongated opening and the corresponding channel are configured to receive the first fastener;
        a pivot feature, wherein the plate is configured to be rotated about the pivot feature to transition the first locking mechanism between a locked and an unlocked configuration; and
        a spring mechanism configured to hold the plate in the locked position within the latch body; and
    an adjustment mechanism which laterally moves the latch body and the first locking mechanism relative to the first fastener such that the first fastener is laterally adjusted within the elongated opening, wherein manipulation of the adjustment mechanism alters a distance between the first fastener and the second fastener to adjust a width of a gap formed between the first structural member and the second structural member.

2. The apparatus of claim 1, wherein the latch body further comprises:
    a retaining structure configured to hold the plurality of locking mechanisms; and
    a cover.

3. The apparatus of claim 1, wherein the plate is configured to be rotated about the pivot feature into the unlocked position such that the opening in the plate is aligned with the corresponding channel through the latch body within selected tolerances.

4. The apparatus of claim 3, wherein a fastener is configured to freely move within the corresponding channel through the latch body when the plate is in the unlocked position and the opening in the plate is aligned with the corresponding channel within the selected tolerances.

5. The apparatus of claim 1, wherein the pivot feature is associated with at least one of the plate and the retaining structure of the latch body.

6. The apparatus of claim 1, wherein a fastener that has at least partially passed through the opening in the plate is locked in place when the plate is in the locked position.

7. The apparatus of claim 1, wherein the first structural member comprises a panel forming a sidewall for an interior of an aircraft.

8. The apparatus of claim 1, further comprising: the adjustment mechanism which laterally moves the second locking mechanism housed within the latch body in a lateral direction relative to the first fastener.

9. The apparatus of claim 8, wherein the opening in the plate and the corresponding channel are elongated in the lateral direction.

10. The apparatus of claim 1 further comprising:
    a housing configured to house the latch body.

11. The apparatus of claim 1, wherein the elongated opening has a shape selected from one of an elongated circular shape, an oval shape, and a rectangular shape and wherein the corresponding channel has a shape selected from one of a circular cylindrical shape, an elongated cylindrical shape, an elliptic cylindrical shape, a hyperbolic cylindrical shape, a parabolic cylindrical shape, and a prism shape.

12. The apparatus of claim 1, wherein the spring mechanism further comprises:
    a plurality of compression springs maintaining the plate in the locked position when the plurality of compression springs are relaxed, wherein rotation of the plate about the pivot feature applies a load to at least one compression spring in the plurality of compression springs so as to transition the plate to the unlocked position, the spring mechanism comprising at least a first spring and a second spring positioned on opposite sides of the plate.

13. A latch comprising:
    a housing;
    a latch body housed within the housing and having a plurality of channels that extend through the latch body; and
    a first locking mechanism receiving a first fastener attached to a first structural member and a second locking mechanism receiving a second fastener attached to a second structural member, wherein the first locking mechanism and the second locking mechanism are housed within the latch body, wherein the first locking mechanism comprises:
- a plate having an elongated opening positioned relative to a corresponding channel in the plurality of channels, wherein the elongated opening and the corresponding channel are configured to receive the first fastener;
- a pivot feature, wherein the plate is configured to be rotated about the pivot feature; and
- a spring mechanism configured to hold the plate in a locked position within the latch body; and an adjustment mechanism which laterally moves the latch body and the first locking mechanism relative to the first fastener such that the first fastener is laterally adjusted within the elongated opening, wherein manipulation of the adjustment mechanism alters a distance between the first fastener and the second fastener to adjust a width of a gap formed between the first structural member and the second structural member.

14. The latch of claim 13, wherein the spring mechanism further comprises:
first and second compression springs positioned on opposite sides of the plate of the first locking mechanism and third and fourth compression springs positioned on opposite sides of the plate of the second locking mechanism.

15. A method for attaching a latch to a number of panels, the method comprising:
applying a load to a spring mechanism in the latch to move a first plate and a second plate in the latch into an unlocked position such that a first fastener attached to a first structural member is allowed to pass through an elongated opening in the first plate and a second fastener attached to a second structural member is allowed to pass through an opening in the second plate, wherein the spring mechanism, the first plate, and the second plate form a locking mechanism that is housed within a latch body;
removing the load applied to the spring mechanism after a selected portion of the first fastener has passed through the elongated opening in the first plate such that the first plate moves into a locked position; and
manipulating an adjustment mechanism to laterally move the latch body and the first locking mechanism relative to the first fastener such that the first fastener is laterally adjusted within the elongated opening, wherein manipulation of the adjustment mechanism alters a distance between the first fastener and the second fastener to adjust a width of a gap formed between the first structural member and the second structural member.

16. The method of claim 15, wherein the step of applying the load to the spring mechanism comprises:
inserting the first fastener through a channel in the latch body corresponding to the elongated opening in the first plate; and
applying a force to the first fastener at the elongated opening of the first plate that causes the load to be applied to the spring mechanism in the latch and move the first plate in the latch into the unlocked position.

17. The method of claim 16, wherein the step of removing the load applied to the spring mechanism comprises:
removing the load applied to the spring mechanism after the selected portion of the first fastener has passed through the elongated opening in the first plate such that the first plate moves into the locked position and locks the first fastener in place with respect to an axis, wherein locking the first fastener in place attaches the latch to the first structural member.

18. The method of claim 15 further comprising:
moving the latch body in a lateral direction along an axis relative to the first fastener using the adjustment mechanism in the latch.

19. The method of claim 18, wherein the step of moving the latch body comprises:
moving the latch body in the lateral direction along the axis relative to the first fastener using the adjustment mechanism in the latch, wherein the elongated opening in the first plate and a corresponding channel through the latch body are elongated with respect to the axis to allow the first fastener to move freely within the corresponding channel.

20. The method of claim 15, wherein the spring mechanism comprises at least a first spring and a second spring positioned on opposite sides of each of the first plate and the second plate.

* * * * *